(12) United States Patent
Xiao

(10) Patent No.: US 11,678,606 B2
(45) Date of Patent: Jun. 20, 2023

(54) GARDEN TOOL AND POWER HEAD THEREOF

(71) Applicant: Globe (Jiangsu) Co., Ltd, Jiangsu (CN)

(72) Inventor: Yu Xiao, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 320 days.

(21) Appl. No.: 17/109,162

(22) Filed: Dec. 2, 2020

(65) Prior Publication Data

US 2021/0169001 A1    Jun. 10, 2021

(30) Foreign Application Priority Data

Dec. 6, 2019    (CN) .......................... 201911240156.6

(51) Int. Cl.
| | | |
|---|---|---|
| *A01D 34/81* | (2006.01) | |
| *A01D 34/00* | (2006.01) | |
| *A01D 34/68* | (2006.01) | |
| *H02K 5/10* | (2006.01) | |
| *A01D 101/00* | (2006.01) | |
| *A01D 75/18* | (2006.01) | |

(52) U.S. Cl.
CPC ........... *A01D 34/81* (2013.01); *A01D 34/003* (2013.01); *A01D 34/68* (2013.01); *H02K 5/10* (2013.01); *A01D 75/18* (2013.01); *A01D 2101/00* (2013.01)

(58) Field of Classification Search
CPC ...... A01D 34/81; A01D 34/003; A01D 34/68; A01D 75/18; H02K 5/10
See application file for complete search history.

(56) References Cited

U.S. PATENT DOCUMENTS

| | | | | |
|---|---|---|---|---|
| 3,641,749 A | * | 2/1972 | Dwyer, Jr. | ......... A01D 34/6806 56/17.5 |
| 6,434,918 B1 | | 8/2002 | Csonka et al. | |
| 7,861,503 B1 | | 1/2011 | Campbell | |

(Continued)

FOREIGN PATENT DOCUMENTS

| | | |
|---|---|---|
| CN | 109463098 A | 3/2019 |
| CN | 209563197 U | 11/2019 |
| EP | 3095311 A1 | 11/2016 |

OTHER PUBLICATIONS

The extended European Search Report of counterpart European Patent Application No. 20212133.1 dated May 7, 2021.

*Primary Examiner* — Thomas B Will
*Assistant Examiner* — Julia C Tran

(57) ABSTRACT

A lawn mower includes a main body and a power head mounted on the main body. The main body comprises a mounting shell recessed with a mounting groove. The power head comprises a motor assembly received in the mounting groove and a housing assembly covering the motor assembly. The motor assembly comprises a motor base assembled with the mounting shell and a motor fixed on the motor base. The bottom of the motor base is sealed and the side of the motor base is provided with an air outlet and a waterproof rib protruding from the air outlet for partial shielding. The installation bottom surface of the housing assembly corresponding to the air outlet at least partially overlaps the waterproof rib in an up and down direction. Compared with the prior art, the lawn mower has good waterproof performance.

15 Claims, 8 Drawing Sheets

(56) References Cited

U.S. PATENT DOCUMENTS

| | | | |
|---|---|---|---|
| 8,227,948 B1* | 7/2012 | Fox | H02K 1/06 |
| | | | 310/88 |
| 2001/0052733 A1* | 12/2001 | Fujii | H02K 5/10 |
| | | | 310/58 |
| 2004/0083701 A1 | 5/2004 | Brower | |
| 2010/0109454 A1* | 5/2010 | Vadillo | H02K 5/10 |
| | | | 310/58 |
| 2012/0317950 A1* | 12/2012 | Abe | A01D 34/81 |
| | | | 56/11.9 |
| 2016/0338266 A1* | 11/2016 | Yamaoka | A01D 34/82 |
| 2018/0235146 A1* | 8/2018 | Hashimoto | A01D 34/81 |
| 2020/0196522 A1 | 6/2020 | Feng et al. | |
| 2020/0267903 A1* | 8/2020 | Gao | H05K 5/02 |
| 2020/0288634 A1 | 9/2020 | Hasegawa et al. | |
| 2020/0288635 A1* | 9/2020 | Ito | A01D 34/81 |

\* cited by examiner

GARDEN TOOL AND POWER HEAD THEREOF

CROSS-REFERENCE TO RELATED INVENTIONS

This application is based upon and claims the benefit of priority from the prior Chinese Patent Application No. 201911240156.6, filed on Dec. 6, 2019, the entire contents of which are incorporated herein by reference.

TECHNICAL FIELD

The invention relates to a garden tool.

BACKGROUND ART

Lawn mowers are the most common garden tool for lawn care works. After the lawn mower is used for a period of time, some dirt such as grass clippings, dust and other dirt that are difficult to clean and remove can accumulate on the surface of the lawn mower. The operator generally uses the water to clean the lawn mower. At this time, the waterproof performance of the lawn mower is particularly important, and it is necessary to ensure that the lawn mower is not damaged by a large amount of water and the operator safety.

After the machine is used, it is generally necessary to turn the machine 90° to flush the bottom shell cavity with high-pressure water. Most lawn mowers on the market currently dissipate the heat generated during the operation of the motor into the air. The air outlet is designed under the power head, but this design has to require users to abandon the need to clean the bottom shell cavity with high-pressure water.

In view of this, it is necessary to improve the waterproof structure of the lawn mower in order to solve the mention problems.

SUMMARY OF INVENTION

An object of the present invention is to provide a lawn mower, which has better waterproof performance.

In order to achieve the above object, the present invention provides a garden tool comprising a main body and a power head mounted on the main body. The main body comprises a mounting shell recessed with a mounting groove. The power head comprises a motor assembly received in the mounting groove and a housing assembly covering the motor assembly. The motor assembly comprises a motor base assembled with the mounting shell and a motor fixed on the motor base. The bottom of the motor base is sealed and the side of the motor base is provided with an air outlet and a waterproof rib protruding from the air outlet for partial shielding. The installation bottom surface of the housing assembly corresponding to the air outlet at least partially overlaps the waterproof rib in an up and down direction.

As a further improvement of the present invention, a first annular groove is further recessed in the mounting shell, the first annular groove is formed on the periphery of the mounting groove, and the recessed depth of the first annular groove is greater than the recessed depth of the mounting groove, a leakage hole being provided in the first annular groove, and the leakage hole communicating with the outside.

As a further improvement of the present invention, the motor assembly further comprises a fan provided on the top of the motor, an air guide rib is provided at the air outlet, and the air guide rib is deflected so the airflow direction at the air outlet is consistent with the rotation direction of the fan, the waterproof rib being formed between two adjacent air guide ribs, and a first inclined slope inclining downward being formed at one side of the waterproof rib away from the annular groove, a second inclined slope 3121 inclining upward being formed at one side of the waterproof rib close to the annular groove, which guides the airflow flowing out from the air outlet.

As a further improvement of the present invention, a groove is recessed in the bottom of the motor base, the groove is located below the motor, and an opening is provided at an end of the groove near the air outlet, which communicates with the outside to discharge water in the groove.

As a further improvement of the present invention, a second annular groove is provided at the middle of the bottom of the motor base, the motor is located above the second annular groove, and the power head further comprises a wool felt received in the second annular groove which is used to connect the motor and the second annular groove and seal the gap between the motor and the second annular groove.

As a further improvement of the present invention, a perforation through which the motor shaft of the motor passes is further provided at the middle of the bottom of the motor base, and the second annular groove is provided on the outside of the perforation, four grooves being provided and evenly distributed on the periphery of the annular groove.

As a further improvement of the present invention, the housing assembly comprises a first casing and a second casing assembled with the motor base, and the first casing and the second casing are assembled and fixed to each other, the first casing being provided with a protruding rib, and the second casing being correspondingly provided with a receiving groove, and the protruding ribs being received in the receiving groove to seal the installation gap between the first casing and the second casing.

As a further improvement of the present invention, the first casing and the second casing are respectively provided with an air inlet and an air inlet cavity, the air inlet is inclined downward and backward, and the air inlet cavity includes a first ramp provided near the air inlet and a second ramp provided far from the air inlet, the first ramp going downhill toward the air inlet and the second ramp going uphill toward the air inlet.

As a further improvement of the present invention, the first casing is provided with a first water-retaining portion, the second casing is provided with a second water-retaining portion, and the first water-retaining portion connects with the second water-retaining portion.

As a further improvement of the present invention, the housing assembly further comprises an upper casing which covers the top of the first casing and the second casing and a flip cover which can be turned relative to the upper casing, and a third water-retaining portion is provided at the position of the upper casing connected with the flip cover to seal the gap between the upper casing and the flip cover.

The present invention provides a power head comprises a motor assembly and a housing assembly covering the motor assembly, the motor assembly comprising a motor base and a motor fixed on the motor base, the bottom of the motor base being sealed and the side of the motor base being provided with an air outlet and a waterproof rib protruding from the air outlet for partial shielding, the installation bottom surface of the housing assembly corresponding to the air outlet at least partially overlapping the waterproof rib in an up and down direction.

As a further improvement of the present invention, the motor assembly further comprises a fan provided on the top of the motor, an air guide rib is provided at the air outlet, and the air guide rib is deflected so the airflow direction at the air outlet is consistent with the rotation direction of the fan, the waterproof rib being formed between two adjacent air guide ribs, and a first inclined slope inclining downward being formed at one side of the waterproof rib, a second inclined slope inclining upward being formed at the other side of the waterproof rib.

As a further improvement of the present invention, a groove is recessed in the bottom of the motor base, the groove is located below the motor, and an opening is provided at an end of the groove near the air outlet.

As a further improvement of the present invention, the housing assembly comprises a first casing and a second casing assembled with the motor base, and the first casing and the second casing are assembled and fixed to each other, the first casing being provided with a protruding rib, and the second casing being correspondingly provided with a receiving groove, and the protruding ribs being received in the receiving groove.

As a further improvement of the present invention, the first casing and the second casing are respectively provided with an air inlet and an air inlet cavity, the air inlet is inclined downward and backward, and the air inlet cavity includes a first ramp provided near the air inlet and a second ramp provided far from the air inlet, the first ramp going downhill toward the air inlet and the second ramp going uphill toward the air inlet.

As a further improvement of the present invention, the first casing is provided with a first water-retaining portion, the second casing is provided with a second water-retaining portion, and the first water-retaining portion connects with the second water-retaining portion.

As a further improvement of the present invention, the housing assembly further comprises an upper casing which covers the top of the first casing and the second casing and a flip cover which can be turned relative to the upper casing, and a third water-retaining portion is provided at the position of the upper casing connected with the flip cover.

The beneficial effect of the present invention is that, on the one hand, the lawn mower of the present invention is provided with a closed bottom of the motor base and an air outlet on the side, so that when the bottom of the lawn mower is cleaned, water flowing through the air outlet into the motor can be avoided. On the other hand, a waterproof rib is installed at the air outlet for partial shielding, and the installation bottom surface of the housing assembly corresponding to the air outlet is offset from the waterproof rib in the up and down direction, which can prevent water from entering the inside of the motor base through the air outlet to improve the waterproof performance of the lawn mower of the present invention.

DESCRIPTION OF EMBODIMENT

In order to make the objectives, technical solutions, and advantages of the present invention clearer, the following describes the present invention in detail with reference to the accompanying drawings and specific embodiment.

Figure 1:
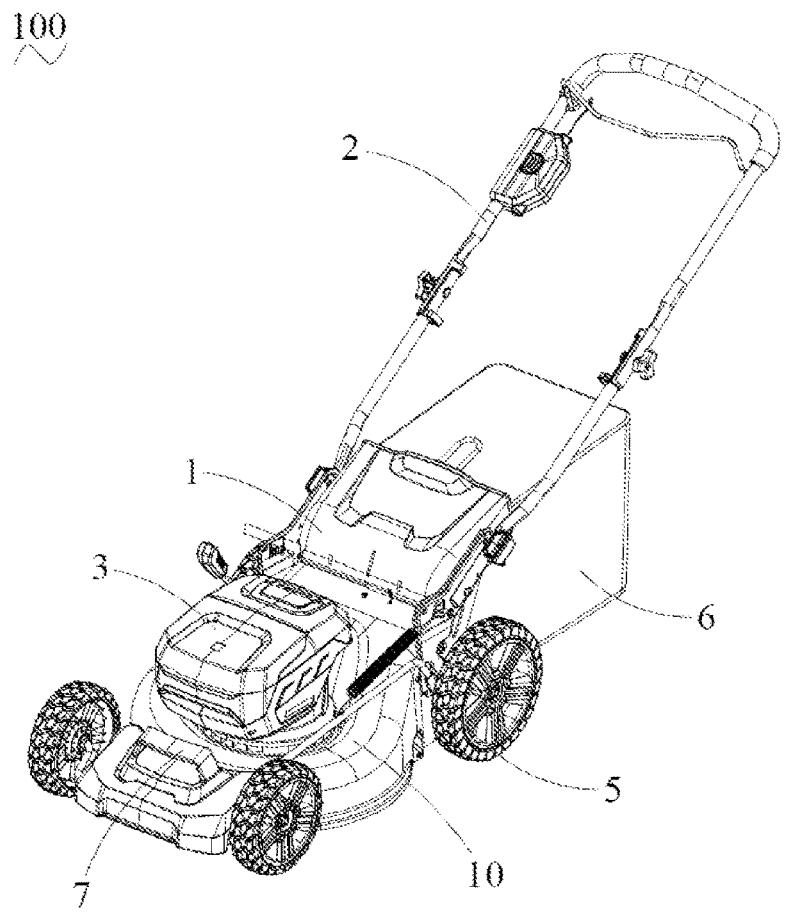
FIG. 1 is a perspective view of the lawn mower according to the present invention.

As shown in FIG. 1, the present invention discloses a lawn mower 100 including a main body 1, a handle 2 extending backward from the rear of the main body 1, a power head 3 mounted on the main body 1, and walking wheels 5 disposed at the bottom of the main body 1 and a grass collecting bag 6 provided behind the main body 1. Because the handle 2, the walking wheels 5 and the grass collecting bag 6 are all existing structures, they will not be described in detail here. The following description will mainly describe the specific structure of the power head 3 and the connecting relationship between the power head 3 and the main body 1 in detail.

Figure 2:
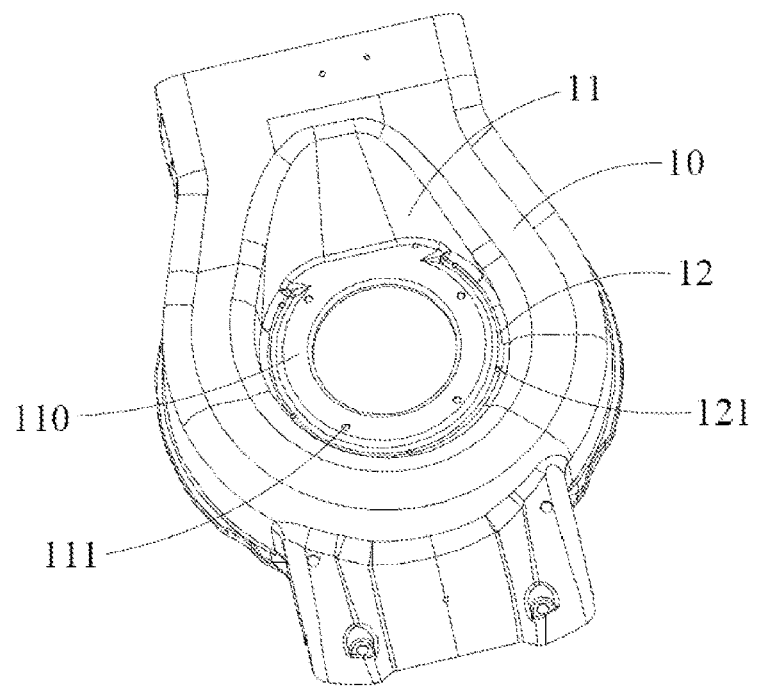
FIG. 2 is a perspective view of the mounting case in FIG. 1.

As shown in FIG. 2, the main body 1 includes a mounting shell 10 recessed with a mounting groove 11. The mounting groove 11 is formed by being recessed downward from the middle position of the mounting shell 10, and the mounting groove 11 is substantially annular. A receiving hole 111 is defined in a bottom wall 110 of the mounting groove 11, so that screws can pass through the receiving hole 111 to fix the bottom of the power head 3 to the bottom wall 110 of the mounting groove 11.

A first annular groove 12 is also recessed in the mounting shell 10. The first annular groove 12 is formed on the periphery of the mounting groove 11 and the recessed depth of the first annular groove 12 is greater than the recessed depth of the mounting groove 11. A leakage hole 121 is provided in the first annular groove 12. When the lawn mower 100 is used in a rainy or humid area, the rainwater on the power head 3 will slide into the first annular groove 12, and then flows out from the leakage hole 121.

In this embodiment, four receiving holes 111 are provided to stably install the power head 3 in the mounting shell 10. Five leakage holes 121 are provided and evenly distributed in the first annular groove 12 to divide the accumulated water in the first annular groove 12 to ensure that all the accumulated water in the first annular groove 12 is discharged.

The power head 3 can be a replaceable component to replace an internal combustion engine. And the power head 3 can be applied to a variety of equipment, such as outdoor power equipment, including lawn mower, snow sweeper, cleaning machine, cultivator etc. The present invention will take a lawn mower as an example to describe the specific structure and function of the power head 3 in detail, but it should not be limited to this.

As shown in FIG. 3 to FIG. 8 in combination with FIG. 2, the power head 3 includes a motor assembly 30 received in the mounting groove 11, an energy device (not shown), and a housing assembly 40 for accommodating the motor assembly 30 and the energy device. The energy device is preferred a battery pack which is detachable mounted on the power head. The battery pack can also be used in the other power tools, such as string trimmer, chain saw. The housing assembly 40 includes an air inlet 41 and an air outlet 311, and the housing assembly 40 also includes an air inlet cavity 42 connected to the air inlet 41. The motor assembly 30 includes a motor base 31 cooperating with the mounting shell 10, a motor 32 fixed on the motor base 31, a fan 33 arranged on the top of the motor 32, and an air collecting cover 34 for covering the motor 32 and the fan 33.

The bottom of the motor base 31 is sealed, an air outlet 311 is located on the side of the motor base 31 communicated with the outside and a waterproof rib 312 disposed in the air outlet 311 for partial shielding. The waterproof rib 312 makes the motor base 31 and the housing assembly 40 arranged up and down. That is, the installation bottom surface of the housing assembly 40 corresponding to the air outlet 311 is lower than the upper surface of the waterproof rib 312, so that rainwater can be prevented from splashing into the air outlet 311 and entering the motor 32.

The upper surface of the first annular groove 12 is also lower than the upper surface of the waterproof rib 312, which can prevent water from entering the motor base 31 from the air outlet 311. The bottom of the motor base 31 and the bottom wall 110 of the mounting groove 11 are fastened by screws which go through the receiving hole 111. The first annular groove 12 is distributed around the periphery of the motor base 31, in other words, the motor base 31 does not block the first annular groove 12, so the rainwater flowing down from the top of the power head 3 will flow into the first annular groove 12 along the housing assembly 40 of the power head 3, and finally drain out from the leakage hole 121 in the first annular groove 12.

It should be noted that some air outlets 311 can be provided on the side wall of the motor base 31. That is, at least two air outlets 311 can be provided. In the embodiment of the present invention, three air outlets 311 are provided to face three directions to let the wind out. Because the air outlet 311 is provided near the bottom of the motor base 31, and the waterproof rib 312 and the housing component 40 are arranged up and down and have a certain height difference, rainwater will not splash into the air outlet 311, and the water in the first annular groove 12 will not flow back into the motor base 31 from the air outlet 311.

Since the air inlet 41 and the air outlet 311 of the power head 3 are located above the bottom shell of the lawn mower 100 and the bottom of the motor base 31 is sealed, when the bottom shell and blades of the lawn mower 100 are cleaned with a high-pressure water, the bottom shell can prevent the water from flowing into the motor 32.

An air guide rib 313 is provided at the air outlet 311, and the air guide rib 313 is deflected and the deflection direction is tangent to the rotation direction of the cooling airflow driven by the fan 33, so that the airflow direction at the air outlet 311 is consistent with the rotation direction of the fan 33. Preferably, when the rotation direction of the cooling airflow driven by the fan 33 is clockwise, the deflection direction of the air guide rib 313 is deflected to the left relative to the rotation direction of the cooling airflow. This design will greatly improve the exchange efficiency of the cold and heat air and can efficiently discharge the heat generated by the lawn mower 100 during work.

The waterproof rib 312 is formed between two adjacent air guide ribs 313, and a first inclined slope 3120 inclining downward is formed at one side of the waterproof rib 312 away from the first annular groove 12, and a second inclined slope 3121 inclining upward is formed at one side of the waterproof rib 312 close to the first annular groove 12, which guides the airflow inside the motor 32 flowing out smoothly from the air outlet 311. At the same time, the second inclined slope 3121 can also make the water splashed on the second inclined slope 3121 flow to the first annular groove 12.

The motor 32 is provided with a motor shaft 321, and the motor shaft 321 is connected to a working assembly (including a blade) of the lawn mower 100 to transmit power to the working assembly. The fan 33 is connected to the rotor of the motor 32, so that when the motor 32 is started, the fan 33 can be driven to rotate. The external cooling air is brought in from the air inlet 41 during the rotation of the fan 33. It flows along the air inlet cavity 42, passes through the motor 32, and finally flows out from the air outlet 311.

A vent 341 is provided on the top of the air collecting cover 34, and the cooling air enters the motor 32 through the vent 341, thereby taking away the heat generated by the motor 32. The air collecting cover 34 and the motor base 31 are connected and fixed by screws (not shown) to surround the motor 32 and the fan 33.

A groove 314 is recessed on the inner side wall of the bottom of the motor base 31, and the groove 314 is located below the motor 32. An opening 3140 is provided at an end of the groove 314 near the air outlet 311. The opening 3140 is used to drain water entering the groove 314. That is, even if a small amount of accumulated water enters the inside of the motor base 31, it will quickly flow to the bottom of the motor base 31 under the action of gravity and collect into the groove 314, and finally the accumulated water is discharged from the opening 3140.

The opening 3140 is designed as a dark window structure. The direction of the opening 3140 is parallel to the bottom surface of the motor base 31. When the bottom of the motor base 31 is washed, water cannot enter the motor base 31.

A perforation 315 and a second annular groove 316 are also provided at the middle of the bottom of the motor base 31. The perforation 315 is provided at the center of the bottom of the motor base 31 to let the motor shaft 321 go through. The second annular groove 316 is provided at the outside of the perforation 315. Two clamping walls 318 are respectively provided on the inner and outer sides of the second annular groove 316. The height of the clamping wall 318 is slightly higher than the bottom surface of the motor base 31. In other words, the two clamping walls 318 protrude beyond the bottom surface of the motor base 31, and a second annular groove 316 is formed between the two clamping walls 318. Four grooves 314 are provided, and they are evenly distributed on the periphery of the second annular groove 316.

The motor 32 is located above the second annular groove 316, and a wool felt 317 is accommodated in the second annular groove 316. The height of the wool felt 317 is greater than the recessed depth of the second annular groove 316 (also can be understood as the height of the clamping wall 318), so the wool felt 317 will protrude from the second annular groove 316, and the wool felt 317 will be pressed during the installation of the motor 32 to deform the wool felt 317. At this time, the wool felt 317 can be used to connect the motor 32 and the second annular groove 316 and seal the gap between the motor 32 and the second annular groove 316. Of course, in other embodiment, the wool felt 317 can also be replaced with other elastic sealing materials, such as rubber rings.

The energy device is preferably a battery pack that supplies power to the motor 32 and other electronic components. The power head 3 is provided with a battery compartment 50 for accommodating a battery pack. The battery compartment 50 and the housing assembly 40 are respectively injection-molded and then assembled, but it should not be limited to this.

The battery pack includes a plurality of cells. In this embodiment, the cells are arranged along the longitudinal direction of the battery pack. In other embodiment, the battery pack may have different shapes, and the cells may be arranged along other directions. Depending on the number and combination of cells, the battery pack can output different voltages. In this embodiment, the battery pack is an 80V battery pack. Of course, battery packs with other voltages are still within the protection scope of the present invention. In the present invention, the number of battery packs is at least two, and the two battery packs are arranged side by side along the lateral direction of the power head 3 and are both located in the battery compartment 50.

Figure 3:
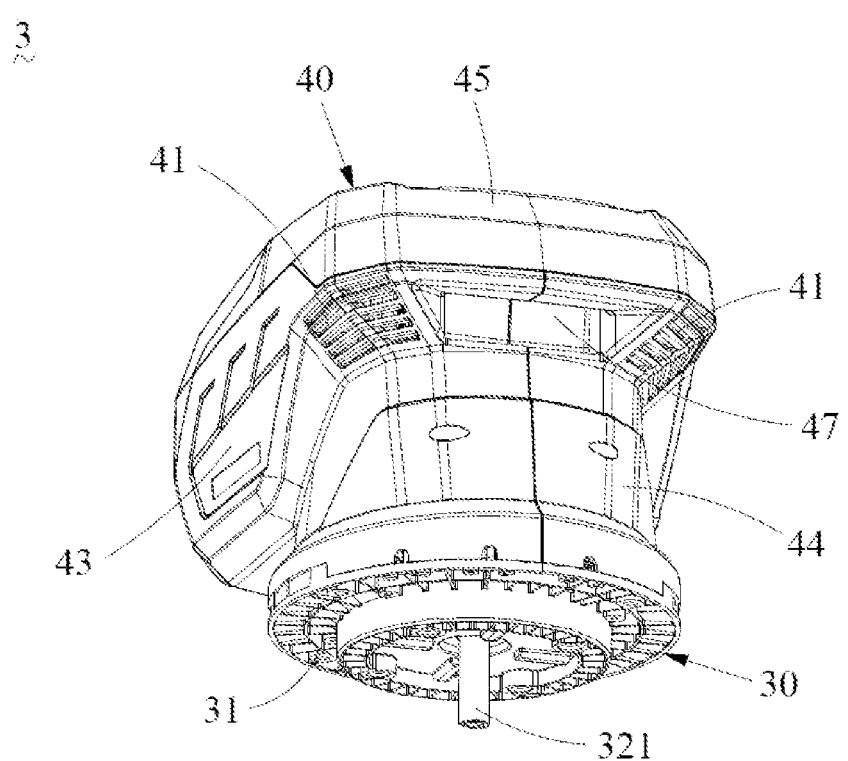
FIG. 3 is a perspective view of the power head in FIG. 1.
Figure 4:
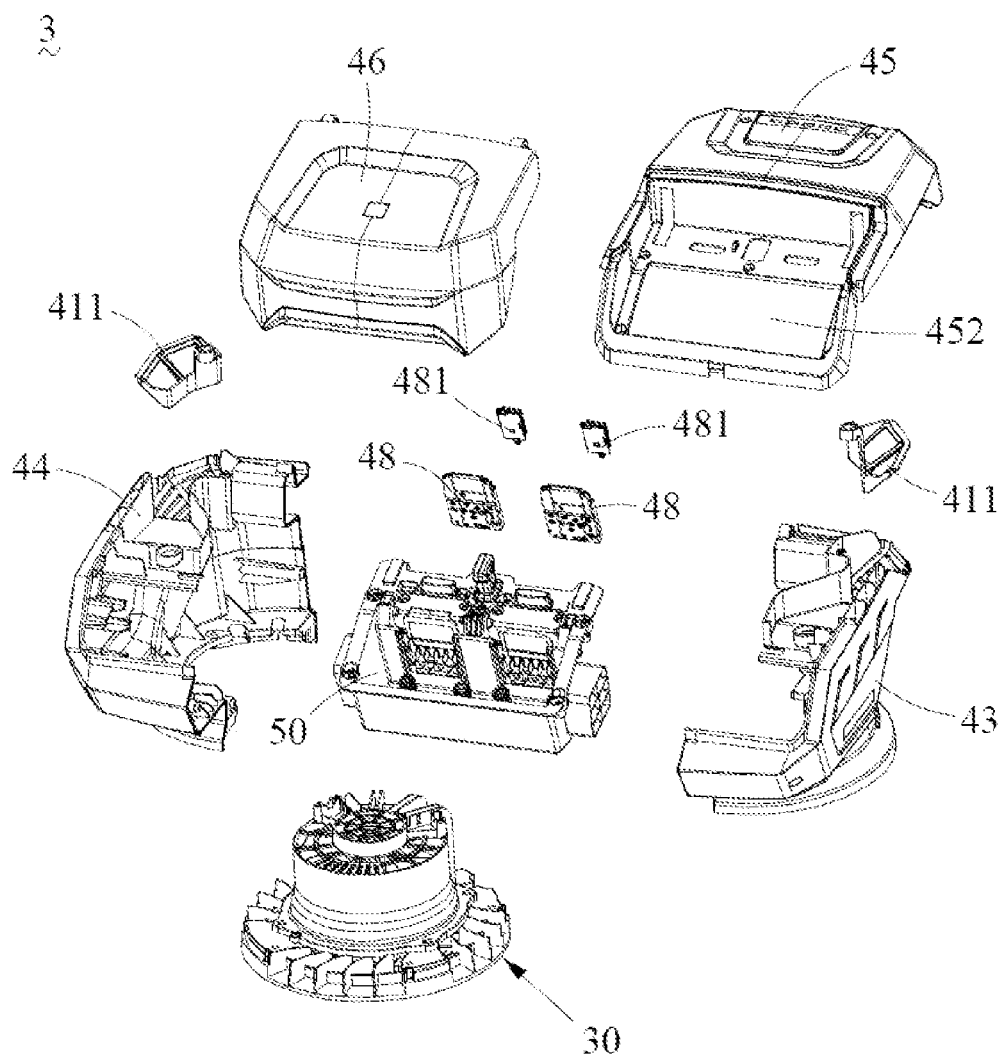
FIG. 4 is an exploded view of the power head shown in FIG. 3.
Figure 5:
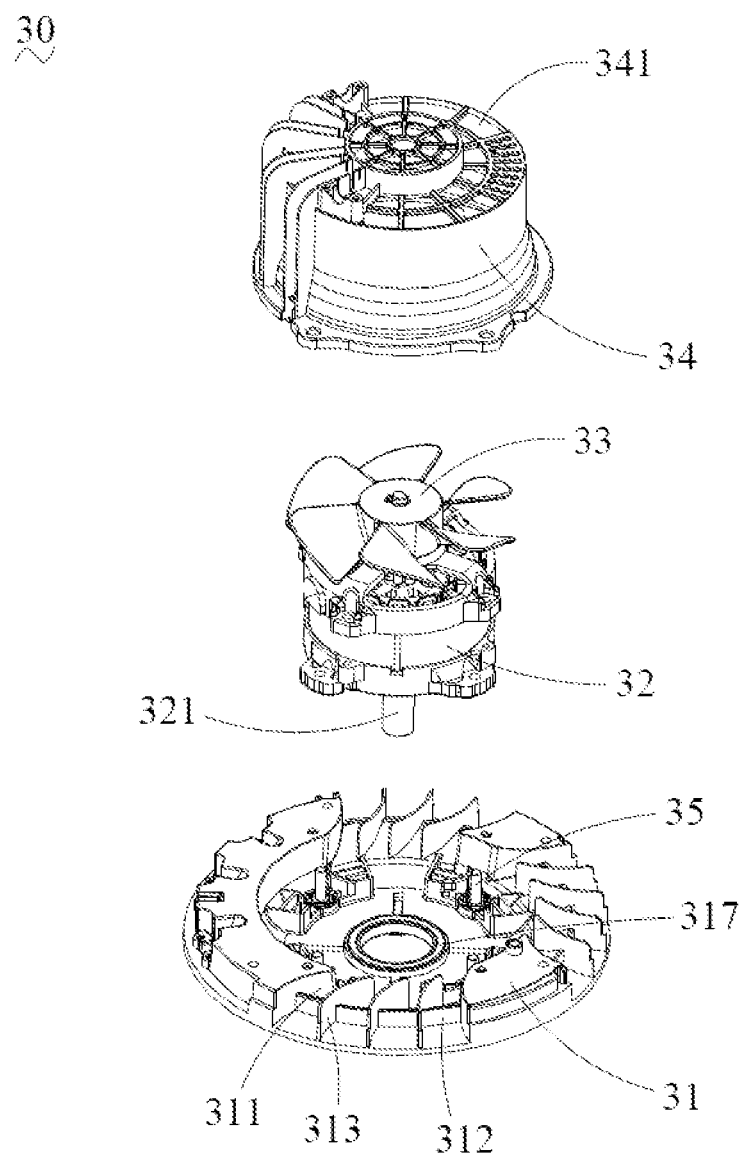
FIG. 5 is an exploded view of the motor assembly in FIG. 4.
Figure 6:
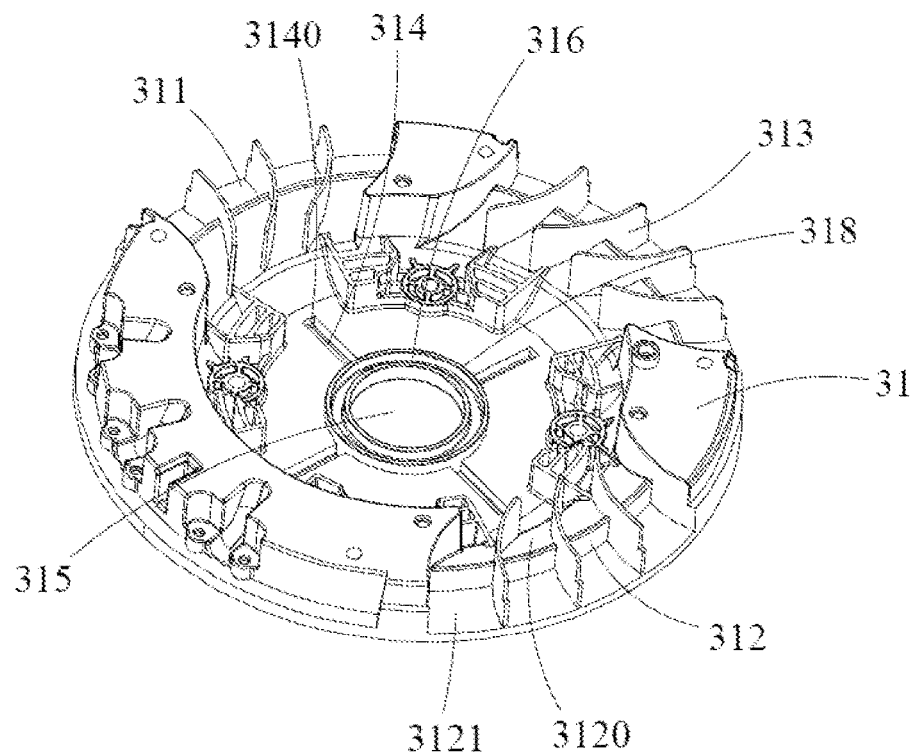
FIG. 6 is a perspective view of the motor base in FIG. 5.
Figure 7:
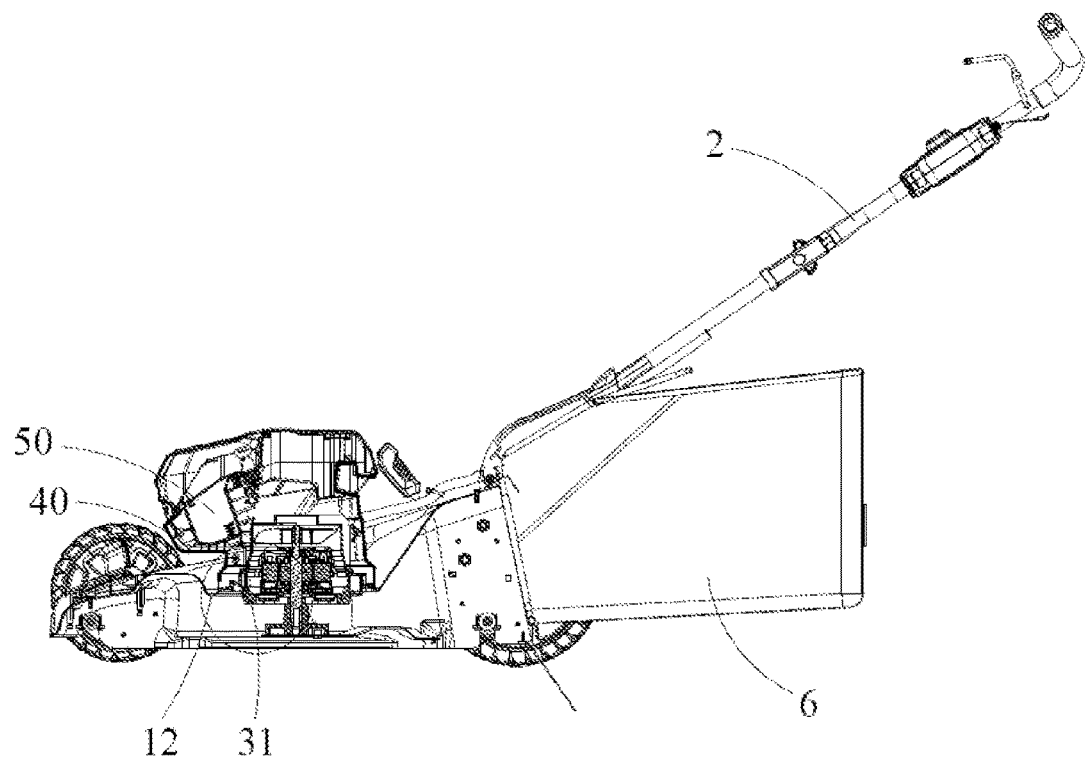
FIG. 7 is a sectional view of the lawn mower shown in FIG. 1.
Figure 8:
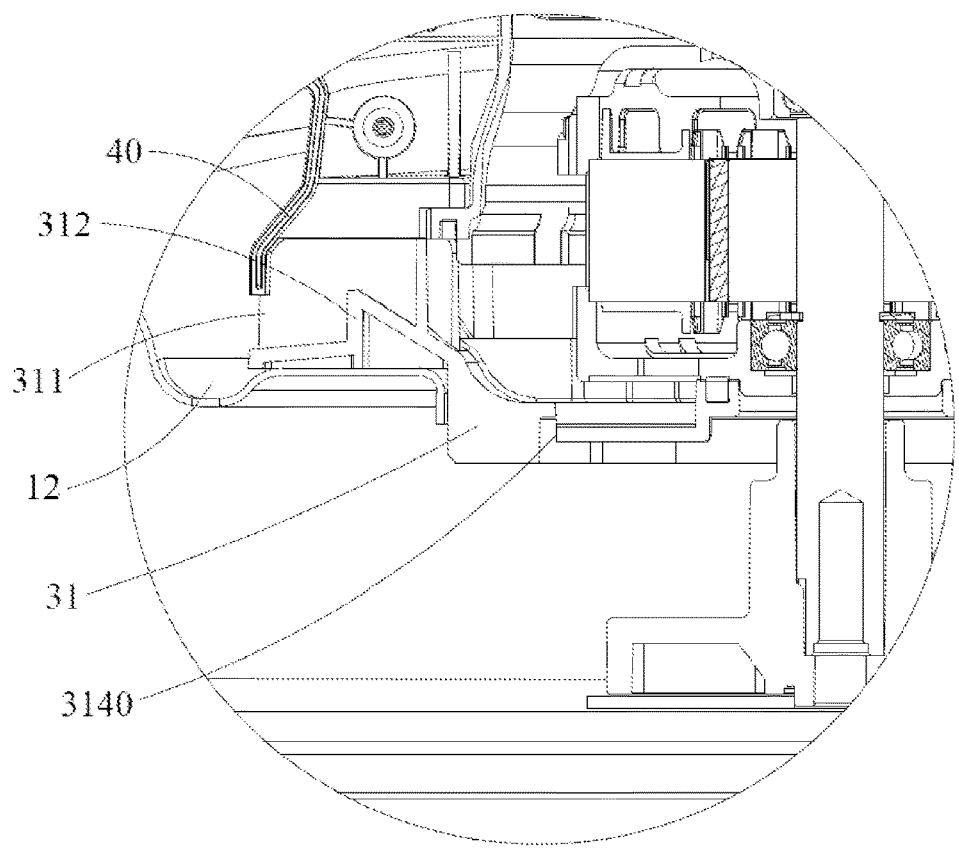
FIG. 8 is an enlarged view of a circled portion in FIG. 7.
Figure 9:
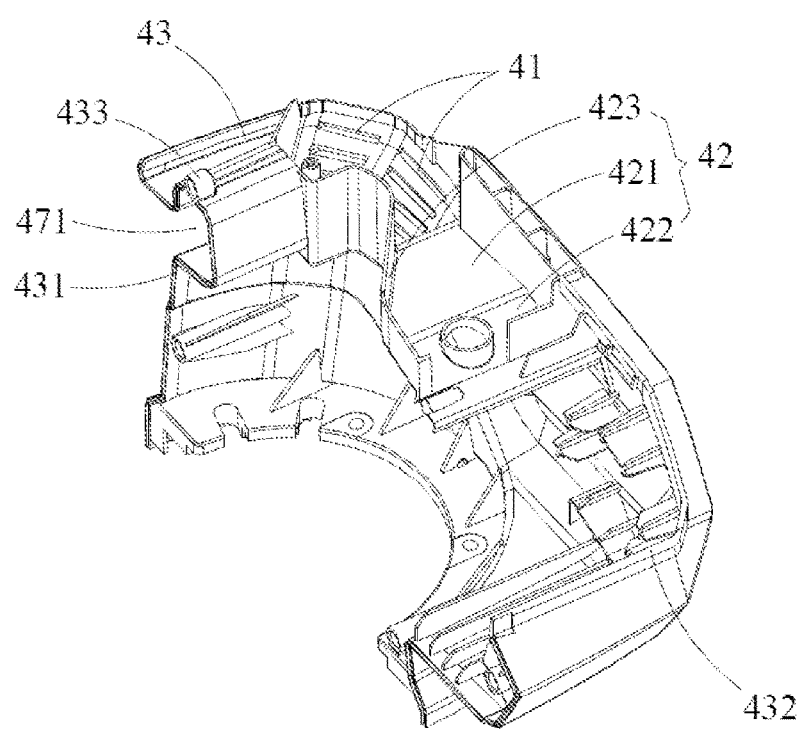
FIG. 9 is a perspective view of the first casing in FIG. 4.
Figure 10:
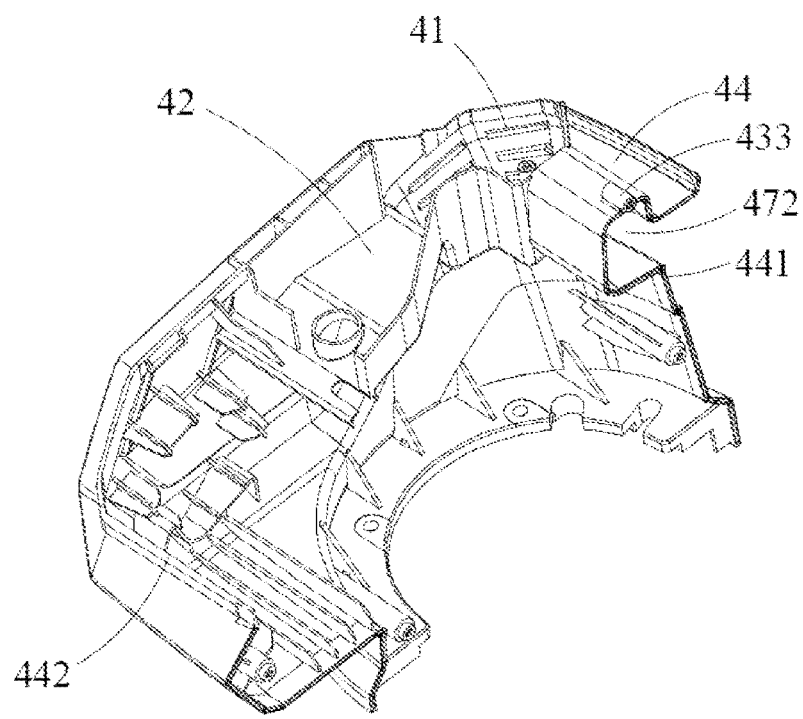
FIG. 10 is a perspective view of the second casing in FIG. 4.
Figure 11:
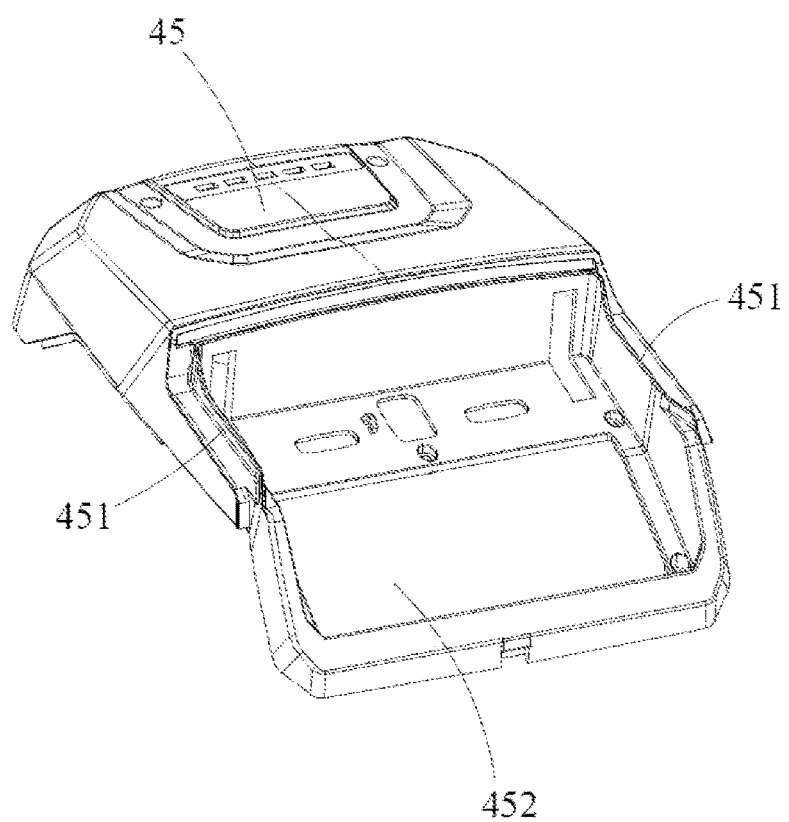
FIG. 11 is a perspective view of the upper casing in FIG. 4.
Figure 12:
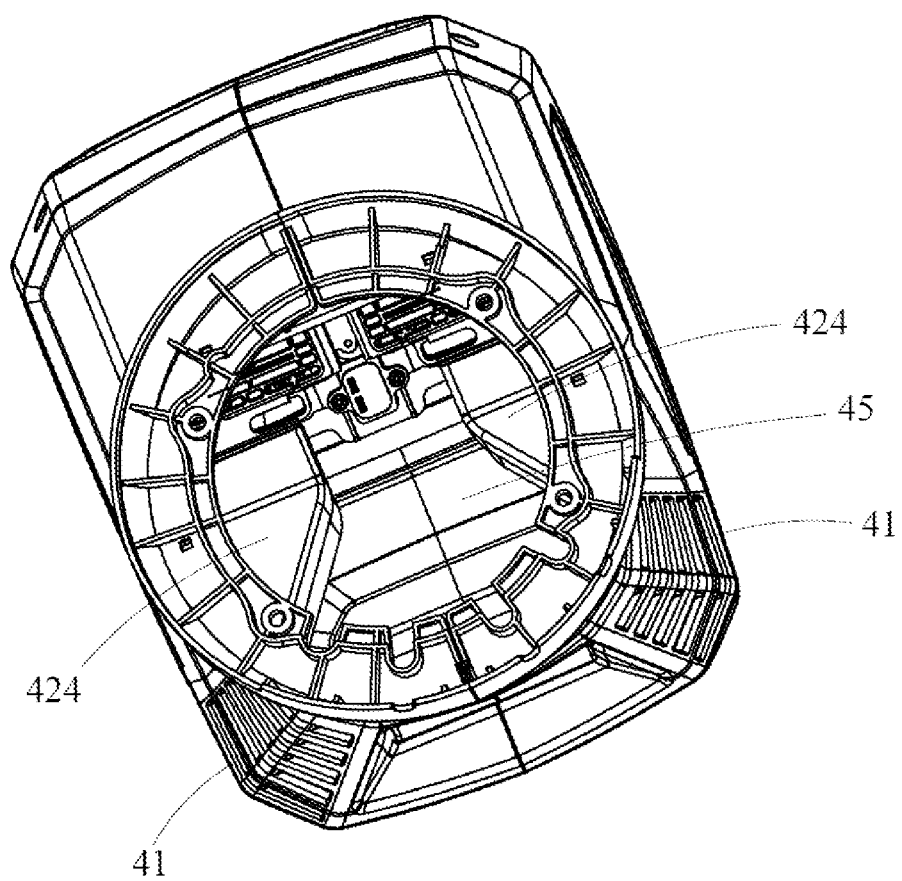
FIG. 12 is a perspective view of the housing assembly after assembly.

As shown in FIG. 9 to FIG. 12 in combination with FIG. 3 and FIG. 4, the housing assembly 40 includes a casing assembled with the motor base 31. The casing includes a first casing 43 and a second casing 44 arranged left and right, an upper casing 45 covering the first casing 43 and the second casing 44, and a flip cover 46 which can be turned relative to the upper casing 45. Firstly, the first casing 43 and the second casing 44 are assembled with the motor base 31, and then the upper casing 45 is fixed to the top of the first casing 43 and the second casing 44. Finally, the flip cover 46 is assembled with the upper casing 45.

The first casing 43 and the second casing 44 are fixed to each other, and a protruding rib 431 is provided on the first casing 43. A receiving groove 441 is correspondingly recessed on the second casing 44, and the protruding rib 431 is received in the receiving groove 441, which not only enables the first casing 43 to be assembled and fixed with the second casing 44 but also seals the installation gap between the first casing 43 and the second casing 44, which realizes a good stability installment and a good waterproof effect.

The top of the first casing 43 and the second casing 44 are provided with the air inlet 41 and the air inlet cavity 42. Since the air inlet 41 on the first casing 43 and the air inlet 41 on the second casing 44 are arranged symmetrically with respect to the center line of the power head 3, and the air inlet cavity 42 on the first casing 43 and the air inlet cavity 42 on the second casing 44 are also arranged symmetrically with respect to the center line of the power head 3, the following description will take the air inlet 41 and the air inlet cavity 42 provided on the first casing 43 as an example for detailed description.

The air inlet 41 is disposed at the left rear of the first casing 43 and is inclined backward and downward, so that when the lawn mower 100 placed on the ground, the rainwater cannot enter the inside of the power head 3 from the air inlet 41. The air inlet cavity 42 includes a first ramp 421 provided near the air inlet 41, a second ramp 422 provided away from the air inlet 41, and a guide piece 423 provided beside the first ramp 421 and the second ramp 422. The first ramp 421, the second ramp 422, the guide piece 423, and the inner side wall of the first casing 43 collectively surround the air inlet cavity 42 into a U-shaped structure with an upper opening.

The first ramp 421 goes downhill toward the air inlet 41, and the second ramp 422 goes uphill toward the air inlet 41. In this way, even if water droplets splash into the air inlet 41, the water will still flow downward from the first ramp 421 and flow out from the air inlet 41. When the upper casing 45 is mounted on the first casing 43 and the second casing 44, the U-shaped air inlet cavity 42 and the upper casing 45 together form a closed airflow passage 424 (see FIG. 12 for details), and the airflow passage 424 extends from the rear end to the front end of the power head 3.

In order to prevent other debris such as grass and dust from entering the inside of the power head 3, a filter element (not shown) is provided in the air inlet cavity 42. In this embodiment, the filter element is a sponge. In order to fix the sponge in the air inlet cavity 42, a fixing bracket 411 is also provided at the air inlet 41 to fix the sponge.

The first casing 43 is provided with a first water-retaining portion 432, the second casing 44 is provided with a second water-retaining portion 442. The first water-retaining portion 432 and the second water-retaining portion 442 are connected to each other and located around the battery compartment 50. When the upper casing 45 is mounted on the first casing 43 and the second casing 44, the two water-retaining portions can fill the gap between the upper casing 45 and the first casing 43 and the second casing 44. Therefore, rainwater will not infiltrate from the joints of the upper casing 45 and the first casing 43 and the second casing 44.

The motor assembly 30 is housed in the rear portion of the first casing 43 and the second casing 44 and is covered by the rear end of the upper casing 45. The battery compartment 50 is provided at the front portion of the first casing 43 and the second casing 44 to separate the motor assembly 30 and the battery pack.

The air inlet 41 and the air inlet cavity 42 are covered by the rear end of the upper casing 45. The front end of the upper casing 45 is provided with a through hole 452 that matches the battery compartment 50 for the insertion and removal of the battery pack. The cell is inserted into the battery compartment 50 through the through hole 452. The flip cover 46 covers the top of the through hole 452 and the battery compartment 50, and the flip cover 46 can be opened and closed with respect to the upper casing 45 so as to perform the plugging operation of the battery pack.

A third water-retaining portion 451 is provided at the position where the upper casing 45 is connected to the flip cover 46 to seal the gap between the upper casing 45 and the flip cover 46, so that rainwater does not flow into the battery compartment 50 from the connection between the upper casing 45 and the flip cover 46. Of course, the flip cover 46 itself can prevent rainwater or other liquids from entering the battery compartment 50, and the third water-retaining portion 451 makes the waterproof effect better. The first water-retaining portion 432, the second water-retaining portion 442, and the third water-retaining portion 451 form a whole water-retaining portion surrounding the through hole 452 to protect the battery compartment 50 and prevent rainwater from entering the battery compartment 50.

A holding cavity 47 is formed at the top and rear ends of the housing assembly 40, and it is recessed from the bottom to top. The holding cavity 47 is formed at an end of the housing assembly 40 near the handle 2 and it is formed on the center line of the power head 3. The holding cavity 47 can be used as a rear handle. The front handle 7 and the rear handle (holding cavity) 47 can be directly held by the left and right hands for carrying. The distance between the front and rear handles is designed to be shorter than the length of the arm, so that the arm is most comfortable with the force. In this way, the machine can be balanced, the labor-saving is for transportation, and the strength of the housing assembly 40 can be increased.

A first L-shaped cavity 471 is formed at the side of the first casing 43 near the second casing 44 and it is recessed from the bottom to the top, and the first L-shaped cavity 471 is provided near the top of the first casing 43. A second L-shaped cavity 472 is at the side of the second casing 44 near the first casing 43 and it is recessed from the bottom to the top. The second L-shaped cavity 472 is disposed near the top of the second casing 44. The holding cavity 47 is formed by combining the first L-shaped cavity 471 and the second L-shaped cavity 472.

Preferably, the first L-shaped cavity 471 and the second L-shaped cavity 472 are symmetrically arranged left and right with respect to the center line of the power head 3, and the first L-shaped cavity 471 and the second L-shaped cavity 472 are both with rounded corners to ensure grip comfort. The width of the holding cavity 47 is greater than 80 mm. In other words, the sum of the widths of the first L-shaped cavity 471 and the second L-shaped cavity 472 is greater than 80 mm.

The protruding rib 431 protrudes from an edge of the first L-shaped cavity 471 of the first casing 43, and the receiving groove 441 is recessed from an edge of the second L-shaped cavity 472 of the second casing 44. A fixing post 433 is provided on the top of the first casing 43 near the protruding rib 431, and a fixing post 433 is also provided on the top of the second casing 44 near the receiving groove 441 side. One of fixing posts is a screw hole and the other is a screw-through hole, so that the first casing 43 and the second casing 44 can be fixed by screws through the two fixing posts 433.

The fixing posts 433 are arranged inside the first casing 43 and the second casing 44, which not only avoids the screws from being inserted from the outside and affects the waterproof effect of the power head 3, but also the two fixing posts 433 are wrapped by the upper casing 45, which makes the appearance of the power head 3 more beautiful.

The housing assembly 40 also includes a control board 48 located near the battery pack for controlling the motor. Two control boards 48 are provided to detect and control the self-propelled motor (not shown) and the main blade motor 32 respectively. One end of the air inlet cavity 42 is connected to the air inlet 41 and the other end extends to the corresponding control board 48 so as to guide the cooling air flow entering from the air inlet 41 to the control board 48.

A cooling fin 481 is provided on the control board 48, and the other end of the air inlet cavity 42 is disposed close to the cooling fin 481. In other words, the air inlet cavity 42 is as close as possible to the cooling fin 481 to ensure that the cooling fin 481 is sufficiently cooled. Since two air inlets 41 and two air inlet cavity 42 are provided, two airflow passages are formed, and the control board 48 and the cooling fin 481 located at the left and right sides of the rear end of the battery compartment 50 can be cooled respectively.

The motor 32 is located below the control board 48. When the motor 32 starts, the fan 33 rotates and drives the cooling airflow at the control board 48 into the motor 32, so that the heat generated by the control board 48, the motor 32, and the battery pack is blown to the bottom of the motor base 31 and discharged from the air outlet 311.

Cooling process is described as below. The motor 32 starts, the fan 33 rotates and generates suction. The external cooling air flows inside through the air inlet 41 and flows into the power head 3 along the air inlet cavity 42 under the action of suction of the fan 33. The cooling air entering inside the power head 3 preferentially passes through the control board 48 and the cooling fin 481, and then the cooling air flows down to the vent 341 of the air collecting cover 34 and enters the inside of the motor 32 from the vent 341. Finally, the cooling air flows out from the air outlet 311 at the bottom of the motor base 31. During the flow of the cooling airflow, the heat inside the battery pack, the control board 48 and the motor 32 will be taken away, so that the power head 3 can work at a relatively stable temperature.

In summary, the lawn mower 100 of the present invention prevents the water from entering the inside of the motor base 31 through the air outlet 311 when cleaning the bottom of the lawn mower 100 by arranging the motor base 31 with a closed bottom and an air outlet 311 on the side. Combined with some waterproof structure design (such as waterproof rib 312, first annular groove 12, leakage hole 121, groove 314, opening 3140, wool felt 317, protruding rib 431, receiving groove 441, first water-retaining portion 432, second water-retaining portion 442 and the third water-retaining portion 451) make the lawn mower 100 of the present invention have the best waterproof performance.

In addition, a holding cavity 47 is provided at the top and rear ends of the power head 3, and the holding cavity 47 can be used as a rear handle. Therefore, when carrying the lawn mower 100, it is not necessary to add additional handle parts, and it is sufficient to carry the handle 7 and the rear handle 47 using the front and left hands separately.

Furthermore, the air inlet 41 and the air inlet cavity 42 are provided at the top and rear ends of the power head 3 so that external cooling air can enter the power head 3 from the air inlet 41 and the air inlet cavity 42 and take away the heat generated by the battery pack, the control board 48 and the motor 32, which makes the heat dissipation performance of the lawn mower 100 of the present invention better.

The above embodiment is only used to illustrate the technical solution of the present invention and is not limiting. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A lawn mower, which comprises:
    a main body, the main body comprising a mounting shell recessed with a mounting groove; and
    a power head mounted on the main body;
    wherein the power head comprises a motor assembly received in the mounting groove and a housing assembly covering the motor assembly,
    the motor assembly comprising a motor base assembled with the mounting shell and a motor fixed on the motor base, the bottom of the motor base being sealed and a side of the motor base being provided with an air outlet and a waterproof rib protruding from the air outlet for partial shielding, the installation bottom surface of the housing assembly corresponding to the air outlet at least partially overlapping the waterproof rib in an up and down direction;
    wherein a first annular groove is further recessed in the mounting shell, the first annular groove is formed on the periphery of the mounting groove, and the recessed depth of the first annular groove is greater than the recessed depth of the mounting groove, a leakage hole being provided in the first annular groove.

2. The lawn mower according to claim 1, wherein the motor assembly further comprises a fan provided on the top of the motor, an air guide rib is provided at the air outlet, and the air guide rib is deflected so the airflow direction at the air outlet is consistent with the rotation direction of the fan, the waterproof rib being formed between two adjacent air guide ribs, and a first inclined slope inclining downward being formed at one side of the waterproof rib away from the annular groove, a second inclined slope-inclining upward being formed at one side of the waterproof rib close to the annular groove.

3. The lawn mower according to claim 1, wherein a groove is recessed in the bottom of the motor base, the groove is located below the motor, and an opening is provided at an end of the groove near the air outlet.

4. The lawn mower according to claim 3, wherein a second annular groove is provided at the middle of the bottom of the motor base, the motor is located above the second annular groove, and the power head further comprises a wool felt received in the second annular groove.

5. The lawn mower according to claim 4, wherein a perforation through which a motor shaft of the motor passes is further provided at the middle of the bottom of the motor base, and the second annular groove is provided on the outside of the perforation, four grooves being provided and evenly distributed on the periphery of the second annular groove.

6. The lawn mower according to claim 1, wherein the housing assembly comprises a first casing and a second casing assembled with the motor base, and the first casing and the second casing are assembled and fixed to each other, the first casing being provided with a protruding rib, and the second casing being correspondingly provided with a receiving groove, and the protruding rib being received in the receiving groove.

7. A lawn mower, which comprises:
a main body, the main body comprising a mounting shell recessed with a mounting groove; and
a power head mounted on the main body;
wherein the power head comprises a motor assembly received in the mounting groove and a housing assembly covering the motor assembly,
the motor assembly comprising a motor base assembled with the mounting shell and a motor fixed on the motor base, the bottom of the motor base being sealed and a side of the motor base being provided with an air outlet and a waterproof rib protruding from the air outlet for partial shielding, the installation bottom surface of the housing assembly corresponding to the air outlet at least partially overlapping the waterproof rib in an up and down direction;
wherein the housing assembly comprises a first casing and a second casing assembled with the motor base, and the first casing and the second casing are assembled and fixed to each other, the first casing being provided with a protruding rib, and the second casing being correspondingly provided with a receiving groove, and the protruding rib being received in the receiving groove, wherein the first casing and the second casing are respectively provided with an air inlet and an air inlet cavity, the air inlet is inclined downward and backward, and the air inlet cavity includes a first ramp provided near the air inlet and a second ramp provided far from the air inlet, the first ramp going downhill toward the air inlet and the second ramp going uphill toward the air inlet.

8. The lawn mower according to claim 7, wherein the first casing is provided with a first water-retaining portion, the second casing is provided with a second water-retaining portion, and the first water-retaining portion connects with the second water-retaining portion.

9. The lawn mower according to claim 6, wherein the housing assembly further comprises an upper casing which covers the top of the first casing and the second casing and a flip cover which can be turned relative to the upper casing, and a third water-retaining portion is provided at the position of the upper casing connected with the flip cover.

10. A power head comprising:
a motor assembly; and
a housing assembly covering the motor assembly;
the motor assembly comprising a motor base and a motor fixed on the motor base, the bottom of the motor base being sealed and a side of the motor base being provided with an air outlet and a waterproof rib protruding from the air outlet for partial shielding, the installation bottom surface of the housing assembly corresponding to the air outlet at least partially overlapping the waterproof rib in an up and down direction;
wherein the motor assembly further comprises a fan provided on the top of the motor, an air guide rib is provided at the air outlet, and the air guide rib is deflected so the airflow direction at the air outlet is consistent with the rotation direction of the fan, the waterproof rib being formed between two adjacent air guide ribs, and a first inclined slope inclining downward being formed at one side of the waterproof rib, a second inclined slope inclining upward being formed at the other side of the waterproof rib.

11. The power head according to claim 10, wherein a groove is recessed in the bottom of the motor base, the groove is located below the motor, and an opening is provided at an end of the groove near the air outlet.

12. The power head according to claim 10, wherein the housing assembly comprises a first casing and a second casing assembled with the motor base, and the first casing and the second casing are assembled and fixed to each other, the first casing being provided with a protruding rib, and the second casing being correspondingly provided with a receiving groove, and the protruding rib being received in the receiving groove.

13. The power head according to claim 12, wherein the first casing and the second casing are respectively provided with an air inlet and an air inlet cavity, the air inlet is inclined downward and backward, and the air inlet cavity includes a first ramp provided near the air inlet and a second ramp provided far from the air inlet, the first ramp going downhill toward the air inlet and the second ramp going uphill toward the air inlet.

14. The power head according to claim 13, wherein the first casing is provided with a first water-retaining portion, the second casing is provided with a second water-retaining portion, and the first water-retaining portion connects with the second water-retaining portion.

15. The power head according to claim 14, wherein the housing assembly further comprises an upper casing which covers the top of the first casing and the second casing and a flip cover which can be turned relative to the upper casing, and a third water-retaining portion is provided at the position of the upper casing connected with the flip cover.

\* \* \* \* \*